United States Patent
Shekhar et al.

(10) Patent No.: US 11,945,430 B2
(45) Date of Patent: Apr. 2, 2024

(54) VEHICLE MOTION CONTROL SYSTEM

(71) Applicant: Volvo Car Corporation, Gothenburg (SE)

(72) Inventors: Rudrendu Shekhar, Gothenburg (SE); Martin Idegren, Gothenburg (SE); Mikael Riikonen, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/967,960

(22) Filed: Oct. 18, 2022

(65) Prior Publication Data

US 2023/0159018 A1   May 25, 2023

(30) Foreign Application Priority Data

Nov. 22, 2021  (EP) .................................. 21209615.0

(51) Int. Cl.
*B60W 30/045* (2012.01)
*B60W 10/04* (2006.01)
(Continued)

(52) U.S. Cl.
CPC .......... *B60W 30/045* (2013.01); *B60W 10/04* (2013.01); *B60W 10/16* (2013.01);
(Continued)

(58) Field of Classification Search
CPC .... B60W 10/04; B60W 10/16; B60W 10/184; B60W 30/045; B60W 2520/26; B60W 2710/12; B60W 2720/14; B60W 2720/406

See application file for complete search history.

(56) References Cited

U.S. PATENT DOCUMENTS

2011/0307129 A1   12/2011  Yu et al.
2015/0065299 A1*  3/2015  Goodrich .............. B60T 8/1769
                                                         701/84

(Continued)

FOREIGN PATENT DOCUMENTS

DE     102009049635 A1   4/2011
EP        3536568 A1     9/2019
EP        3617019 A1     3/2020

OTHER PUBLICATIONS

Apr. 28, 2022 European Search Report issued in corresponding EP Application No. 21209615.

*Primary Examiner* — Edwin A Young
(74) *Attorney, Agent, or Firm* — Clements Bernard Walker; Christopher L. Bernard (57) ABSTRACT

A vehicle motion control system for coordinating and synchronizing a wheel-individual brake system and a power-train torque vectoring actuator system in a vehicle. The wheel-individual brake system includes at least one first actuator for applying a braking torque to individual wheels of the vehicle. The power-train torque vectoring actuator system includes at least one second actuator for applying a torque to individual wheels of the vehicle through a propulsion system. The vehicle motion control system includes a central control function module including a plurality of yaw torque controllers. Each yaw torque controller is configured to receive data including driver inputs and vehicle motion states to determine a respective yaw torque based on the received data for controlling the yaw behavior of the vehicle.

14 Claims, 7 Drawing Sheets

(51) Int. Cl.
*B60W 10/16* (2012.01)
*B60W 10/184* (2012.01)
(52) U.S. Cl.
CPC ....... *B60W 10/184* (2013.01); *B60W 2520/26* (2013.01); *B60W 2710/12* (2013.01); *B60W 2720/14* (2013.01); *B60W 2720/406* (2013.01)

(56) References Cited

U.S. PATENT DOCUMENTS

| | | | |
|---|---|---|---|
| 2016/0039416 A1* | 2/2016 | Shimokawa | B60W 10/16 701/36 |
| 2016/0297439 A1* | 10/2016 | Inoue | B60W 10/184 |
| 2019/0276008 A1* | 9/2019 | Yang | B60W 30/045 |

* cited by examiner

VEHICLE MOTION CONTROL SYSTEM

CROSS-REFERENCE TO RELATED APPLICATION

The present disclosure claims the benefit of priority of co-pending European Patent Application No. 21 209 615.0, filed on Nov. 22, 2021, and entitled "VEHICLE MOTION CONTROL SYSTEM," the contents of which are incorporated in full by reference herein.

TECHNICAL FIELD

The present disclosure relates to a vehicle motion control system, to a vehicle motion control method, to a vehicle including the vehicle motion control system, to a computer program, and to a computer-readable data carrier.

BACKGROUND

Figure 1:
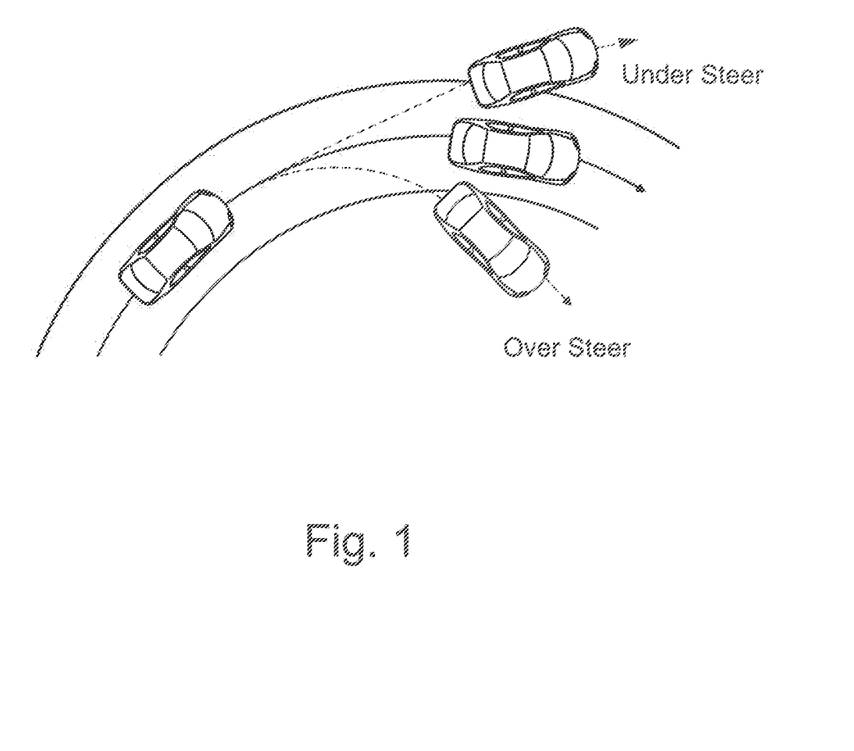
FIG. 1 shows the behavior of an under-steering and an over-steering vehicle.

Under and over-steering describes the yaw attitude of a road vehicle, when it yaws less or more respectively, than the driver's intention. The behavior of an under-steering and an over-steering vehicle is shown in FIG. 1. This could cause an unpleasant driving experience, when the vehicle does not follow the driver's intentions accurately, and in more severe cases, cause the driver to lose control of the vehicle. ESC (electronic stability control) systems are traditionally used to control the yaw behavior of a vehicle by applying friction brake torques to individual wheels. The introduction of power-train actuators like eLSD (electronic limited slip differential), TVDC (torque vectoring dual clutch), electric motors for individual wheels, etc. have increased the possibility of affecting the yaw behavior of the vehicle by controlling the individual wheel torques (otherwise known as torque vectoring actuators) and have been used in a wide variety of vehicle handling applications.

Traditionally, different control algorithms have been used to control the torque vectoring and the ESC systems. In some cases, depending on the vehicle models used in the control algorithms, it might cause one system to compete with the other, instead of complementing, which would result in an inefficient control action.

SUMMARY

There may, therefore, be a need to improve vehicle yaw motion control.

The object is at least partially solved or alleviated by the present disclosure.

According to a first aspect, a vehicle motion control system is provided for coordinating and synchronizing a wheel-individual brake system and a power-train torque vectoring actuator system in a vehicle. The wheel-individual brake system including at least of one first actuator for applying a braking torque to individual wheels of the vehicle, and the power-train torque vectoring actuator system including at least one second actuator for applying a torque to individual wheels of the vehicle through a propulsion system. The vehicle motion control system includes a central control function module that includes a plurality of yaw torque controllers. Each yaw torque controller is configured to receive data including a driver input and a vehicle motion state to determine a respective yaw torque based on the received data for controlling the yaw behavior of the vehicle. The central control function module is configured to determine a driving situation based on the received data. The central control function is further configured to arbitrate the plurality of yaw torques from individual yaw torque controllers to determine a single yaw torque based on the driving situation. The central control function is further configured to determine a prioritization order for the at least one first actuator and at least one second actuator depending on the driving situation and an intended vehicle attribute describing desired characteristics of the vehicle. The central control function is further configured to coordinate the execution of the yaw torque by the wheel-individual brake system and the power-train torque vectoring actuator system to deliver the yaw torque request to the at least one first actuator and at least one second actuator according to the determined prioritization in order to execute the single yaw torque.

The vehicle motion control system as described herein can coordinate and synchronize several different actuators in the wheel-individual brake system and in the power-train torque vectoring actuator system to achieve a corrective yaw torque on the vehicle level. Accordingly, the vehicle motion control system can mitigate under and over-steering behavior and give an agile and safe driving experience.

The at least one first actuator may include a service brake system, which refers to the primary system for braking, for example, but not limited to, an electro-hydraulic brake system, an electro-mechanical brake system, or any combination thereof.

Examples of the at least one second actuator may include, but are not limited to, a wheel-individual electric motor, a torque vectoring dual clutch, a torque vectoring differential, an electronic limited slip differential, or any combination thereof.

Different arbitration strategies could be used, which gives the intended attributes in terms of agility and stability. Based on this arbitrated yaw torque, appropriate actuators may be chosen to apply the yaw torque considering various types of limitations, and feedback of the executed yaw torque from the actuators. This will be explained in detail below and particularly with respect to the example shown in FIG. 4.

Appropriate actuators can be chosen to apply the yaw torque considering the intended vehicle attributes, which describes the desired characteristics of the vehicle. The intended vehicle attributes may be set in the factory, and may be configurable by the driver. For example, the user may select a desired vehicle attribute via a user interface, and the vehicle can automatically coordinate the execution of the yaw torque by the wheel-individual brake system and the power-train torque vectoring actuator system to deliver the yaw torque request to appropriate actuators to apply the yaw torque, such that the desired vehicle attribute is realized. For example, the user may select "comfort" as the desired vehicle attribute in a vehicle having a wheel-individual friction brake system controlled by the ESC, and a powertrain torque vectoring system like dual electric motors. In such a case, when driving significantly below the grip limit, the dual electric motor system could be prioritized over the ESC system as it is usually silent, energy efficient, and can avoid the pump and valve noise that an ESC actuator creates. This can give a more premium driving experience while not compromising on agility and safety. This will be explained in detail below and particularly with respect to the example shown in FIG. 4.

According to an example, the intended vehicle attribute may include energy efficiency, driving experience, safety, noise, vibration, or any combination thereof.

According to an example, the central control function module may be configured to receive data indicative of a yaw torque capability of each actuator, to determine, based on the yaw torque capability, at least one actuator for executing the requested yaw torque, to redistribute the yaw torque request between the at least one first actuator and the at least one second actuator when needed, and to deliver the yaw torque request to at least one determined actuator.

This actuator yaw torque capacity may be used as a limitation for requesting a yaw torque from a particular actuator to avoid over-utilizing any actuator.

According to an example, the central control function module may be configured to receive data indicative of a tire longitudinal force generation capability of each tire of the vehicle, to determine, based on the tire longitudinal force generation capability, at least one actuator for executing the requested yaw torque, to redistribute the yaw torque request between the at least one first actuator and the at least one second actuator when needed, and to deliver the yaw torque request to at least one determined actuator.

This yaw torque capacity may be used as a limitation for requesting a yaw torque using a particular tire to avoid over-utilizing any tire when another tire could be used which has a higher capacity to generate longitudinal forces.

According to an example, the central control function module may be configured to receive a feedback of the amount of yaw torque that has already been executed, to determine, based on the feedback, one or more additional actuators for executing the requested yaw torque, if an insufficient or excessive execution of the requested yaw torque is determined.

In this manner, an accurate amount of the yaw torque can be applied by using several actuators that complement each other.

According to an example, the central control function module may be configured to receive a feedback of individual wheel longitudinal slips, and to control, based on the feedback of individual wheel longitudinal slips, the maximum yaw torque that is requested from the at least one first actuator and/or the at least one second actuator.

This wheel slip limitation can be ensured by controlling the maximum torque that is requested from the actuators based on a feedback control of the individual wheel longitudinal slips.

According to an example, the plurality of yaw torque controllers may include a feedforward controller, a feedback controller, or any combination thereof.

According to an example, the plurality of yaw torques may include a feedforward yaw torque, a feedback under-steer yaw torque, a feedback over-steer yaw torque, or any combination thereof.

According to a second aspect of the present disclosure, a vehicle is provided. The vehicle includes a wheel-individual brake system includes at least one first actuator for applying a braking torque to individual wheels of the vehicle and a power-train torque vectoring actuator system includes at least one second actuator for applying a torque to individual wheels of the vehicle through a propulsion system. The vehicle further includes a vehicle motion control system of the first aspect and any associated example configured to coordinate and synchronize the wheel-individual brake system and the power-train torque vectoring actuator system.

According to an example, the at least one first actuator may include a service brake system capable of applying brake torque to individual wheels.

Examples of the service brake system may include, but are not limited to, an electro-hydraulic brake system, an electro-mechanical brake system, or any combination thereof.

According to an example, the at least one second actuator may include a power-train torque vectoring system configured to apply a propulsion or brake torque to individual wheels.

Examples of the power-train torque vectoring system may include, but are not limited to, a wheel-individual electric motor, a torque vectoring dual clutch, a torque vectoring differential, an electronic limited slip differential, or any combination thereof.

According to an example, the vehicle may include a sensor system includes one or more sensors for detecting the vehicle motion state of the vehicle and the driver input.

According to a third aspect of the present disclosure, a vehicle motion control method is provided for coordinating and synchronizing a wheel-individual brake system and a power-train torque vectoring actuator system in a vehicle, the wheel-individual brake system includes at least one first actuator for applying a braking torque to individual wheels of the vehicle, and the power-train torque vectoring actuator system includes at least one second actuator for applying a torque to individual wheels of the vehicle through a propulsion system. The method includes the steps of:

receiving, by each yaw torque controller in a central control function module, data including a driver input and a vehicle motion state;

determining, by each yaw torque controller in the central control function module, a respective yaw torque based on the received data for controlling the yaw behavior of the vehicle;

determining, by the central control function module, a driving situation based on the received data;

arbitrating, by the central control function module, the plurality of yaw torques from individual yaw torque controllers to determine a single yaw torque based on the driving situation;

determining a prioritization order for the at least one first actuator and at least one second actuator depending on the driving situation and an intended vehicle attribute describing desired characteristics of the vehicle; and coordinating the execution of the yaw torque by the wheel-individual brake system and the power-train torque vectoring actuator system to deliver the yaw torque request to the at least one first actuator and at least one second actuator according to the determined prioritization in order to execute the single yaw torque.

The method may be at least partly computer-implemented, and may be implemented in software or in hardware, or in software and hardware. Further, the method may be carried out by computer program instructions running on means that provide data processing functions, including a non-transitory computer readable medium including instructions stored in a memory and executed by a processor. The data processing means may be a suitable computing means, such as an electronic control module etc., which may also be a distributed computer system. The data processing means or the computer, respectively, may include of one or more processors, a memory, a data interface, or the like.

According to a fourth aspect of the present disclosure, there is provided a computer program, including instructions to cause vehicle motion control system of the first aspect or the vehicle of the second aspect to execute the steps of the method of the third aspect.

According to a further aspect of the present disclosure, there is provided a computer-readable data carrier having stored thereon the computer program.

The controller, such as the central control function module and the yaw torque controller, may be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor and may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs). In various implementations, a processor or controller may be associated with one or more storage media (generically referred to herein as "memory," e.g., volatile, and non-volatile computer memory). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller to implement various aspects of the present disclosure discussed herein. The terms "program" or "computer program" are used herein in a generic sense to refer to any type of computer code (e.g., software or microcode) that can be employed to program one or more processors or controllers.

It should be noted that the above embodiments may be combined with each other irrespective of the aspect involved. Accordingly, the method may be combined with structural features and, likewise, the apparatus and the system may be combined with features described above regarding the method.

These and other aspects of the present disclosure will become apparent from and elucidated with reference to the embodiments described hereinafter.

BRIEF DESCRIPTION OF THE DRAWINGS

Exemplary embodiments of the disclosure will be described in the following with reference to the following drawings.

The figures are merely schematic representations and serve only to illustrate embodiments of the disclosure. Identical or equivalent elements are in principle provided with the same reference signs.

DESCRIPTION OF EMBODIMENTS

Several methods are used today, which affect the handling and yaw behavior of a vehicle either by using wheel-individual friction brake torques, like in the case of ESC system, or by using powertrain torque vectoring actuators like eLSD, TVDC, wheel-individual motors, etc.

Figure 2:
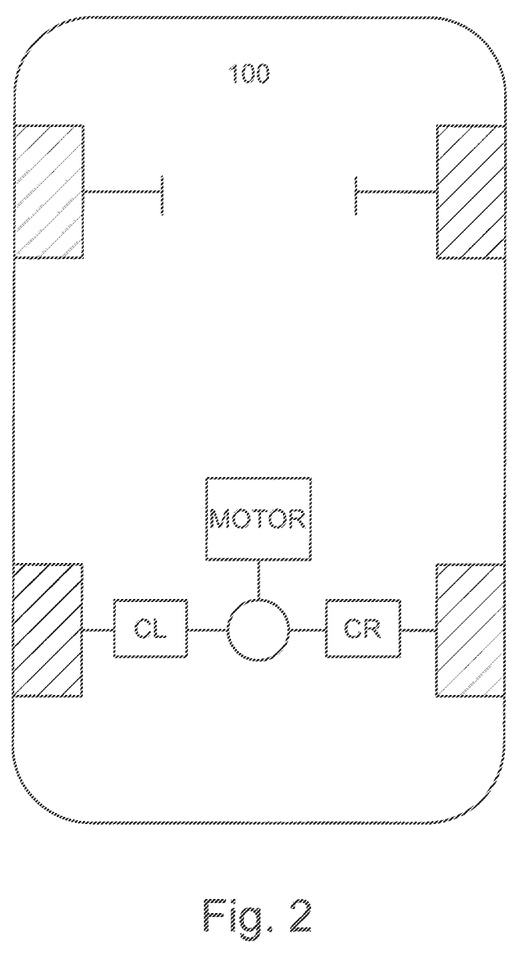
FIG. 2 shows in a schematic top view a vehicle with an overview of an exemplary TVDC with left and right output shafts connected with clutches to a propulsion actuator.

To achieve a certain yaw behavior of the vehicle, a calculated amount of yaw torque needs to be applied at the vehicle level, which can be achieved by either of the systems, or by a combination of both. Solutions that exist today, use either, or both systems in combination, but usually without a communication between them, to coordinate and execute the yaw torque. This could lead to an under or over correction of the yaw behavior, which might be caused due to one more actuator being unable to deliver, or delivering more than requested, which is not compensated for by other actuators. This can be exemplified by a TVDC actuator shown in FIG. 2, which includes wheel-individual clutches CL and CR, which are driven by a propulsion system, like an electric motor shown in FIG. 2, on the axle. In the absence of propulsion or regenerative brake torque, the TVDC actuator cannot control the wheel-individual torques, and thus loses the capability to do torque vectoring. This means that the TVDC actuator is unable to fulfill the yaw torque requested by it, and unless this is compensated for by other actuators, there is a loss of requested yaw torque on the vehicle level. Thus, other actuators like the wheel-individual brake system needs to compensate to maintain the desired yaw behavior of the vehicle.

With solutions that are being used in vehicles today, this problem will not be recognized until the yaw behavior does not show the intended change because of the unexecuted yaw torque request, which causes other systems, like the ESC, to act on it. This makes the control action late, as it must wait for a change in vehicle response, which negatively affects the driving experience and safety.

Powertrain torque vectoring actuators have been used for quite some time and have worked in combination with the ESC system. However, these functions have mostly been implemented in two different ECUs (electronic control unit) and have been calibrated in a way that they work well together, but without any synchronization between them. This limits the possibility to apply an accurate amount of yaw torque due to actuator limitations, and to use the appropriate actuator for the driving situation.

Figure 3:
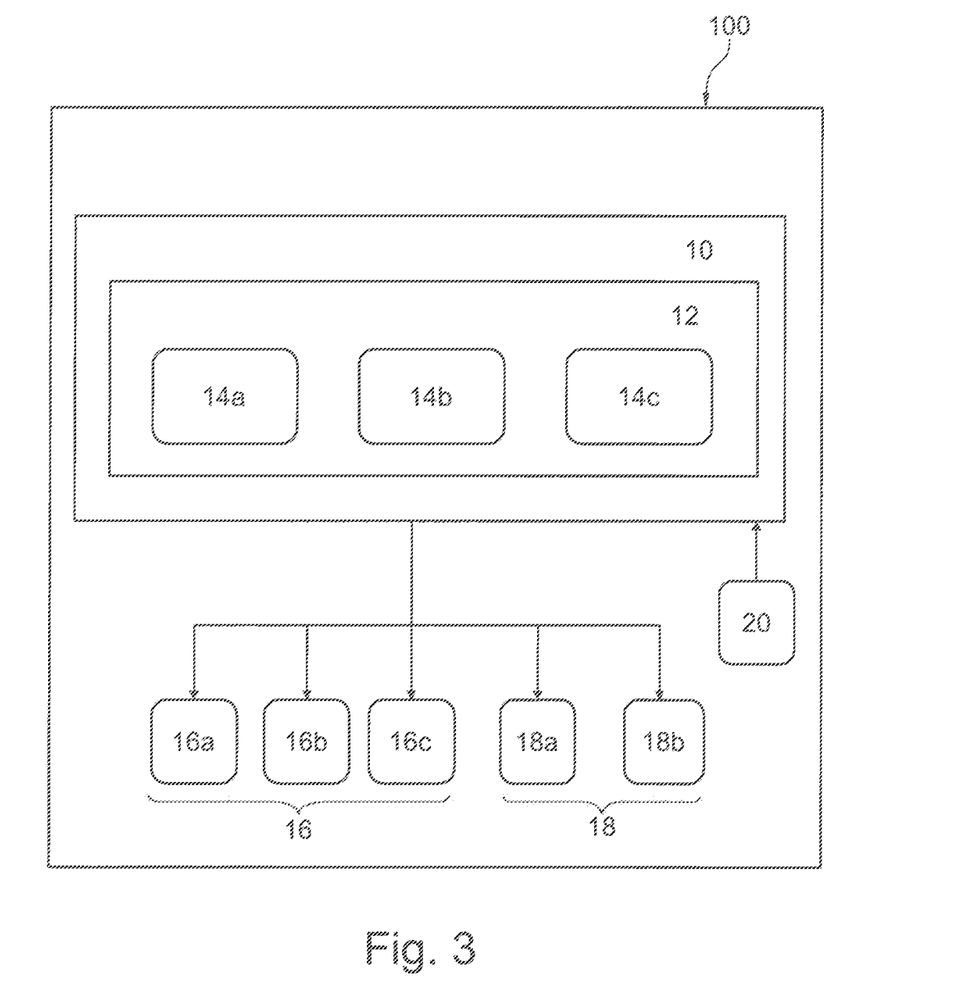
FIG. 3 shows in a block diagram an exemplary vehicle motion control system in a vehicle.

To solve at least one of the above-described problem, FIG. 3 shows in a block diagram of an exemplary yaw motion control system 10 in a vehicle 100. In general, the vehicle 100 has at least one axle with two wheels. The vehicle 100 includes a wheel-individual brake system 16 and a powertrain torque vectoring actuator system 18.

The wheel-individual brake system 16 includes at least one first actuator for applying a braking torque to individual wheels of the vehicle. In some examples, the wheel-individual brake system 16 may include a single first actuator for example, an electro-hydraulic brake system for all wheels. In some examples, the wheel-individual brake system 16 may include two or more first actuators, for example, an electro-hydraulic actuator for one axle, and an electro-mechanical actuator on the other(s). In the example shown in FIG. 3, the wheel-individual brake system 16 includes three first actuators 16*a*, 16*b*, and 16*c*. The first actuator may include a service brake, such as, but not limited to, an electro-hydraulic brake system, an electro-mechanical brake system, an electro-magnetic brake system, or any combination thereof.

The power-train torque vectoring actuator system 18 includes at least one second actuator for applying a torque to individual wheels of the vehicle through a propulsion system (e.g. electrical motor). In some examples, the power-train torque vectoring actuator system 18 may include a single second actuator, for example, an eLSD on one of the axles. In some examples, the power-train torque vectoring actuator system 18 may include two or more second actuators, for example, an eLSD on one axle and a torque vectoring differential on the other. In the example shown in FIG. 3, the power-train torque vectoring actuator system 18 includes two second actuators 18*a* and 18*b*. Examples of the second actuator may include, but are not limited to, a wheel-individual electric motor, a torque vectoring dual clutch, a torque vectoring differential, an electronic limited slip differential, or any combination thereof.

The yaw motion control system 10 includes a central control function module 12, which includes a plurality of yaw torque controllers 14, such as 14*a*, 14*b*, and 14*c* shown in FIG. 3. Examples of the yaw torque controllers 14 may include, but are not limited to, a feed-forward controller, a feedback under-steer controller, a feedback over-steer controller, or a combination thereof.

Each yaw torque controller 14 is configured to receive data including driver inputs and vehicle motion states to determine a respective yaw torque based on the received data for controlling the yaw behavior of the vehicle. The driver inputs may include, but are not limited to, the driver's throttle, brake, and steering inputs. As shown in FIG. 3, the vehicle 100 may include a sensor system 20 with one or more sensors for detecting the vehicle motion states of the vehicle, and the driver inputs. Exemplary sensor inputs may include, but are not limited to, yaw rate, wheel speeds, lateral acceleration, steering wheel angle, etc.

The central control function module 12 is configured to determine a driving situation based on the received data and arbitrate the plurality of yaw torques from the individual yaw torque controllers to determine a single yaw torque based on the driving situation. Different arbitration strategies could be used which gives the intended vehicle attributes in terms of agility and stability.

The intended vehicle attributes describe the desired characteristic the vehicle would like to have. Examples of the intended vehicle attributes may include, but are not limited to, energy efficiency, driving experience, safety, noise, vibration, or any combination thereof. The central control function module 12 is further configured to deliver a yaw torque request to at least one first actuator and/or at least one second actuator to execute the single yaw torque.

To ensure that an accurate amount of the determined yaw torque can be realized, appropriate actuators may be chosen to apply the yaw torque considering various types of limitations and feedback of the executed yaw torque from the actuators. This will be explained further in the sections below, particularly with respect to the example shown in FIG. 4.

Figure 4:
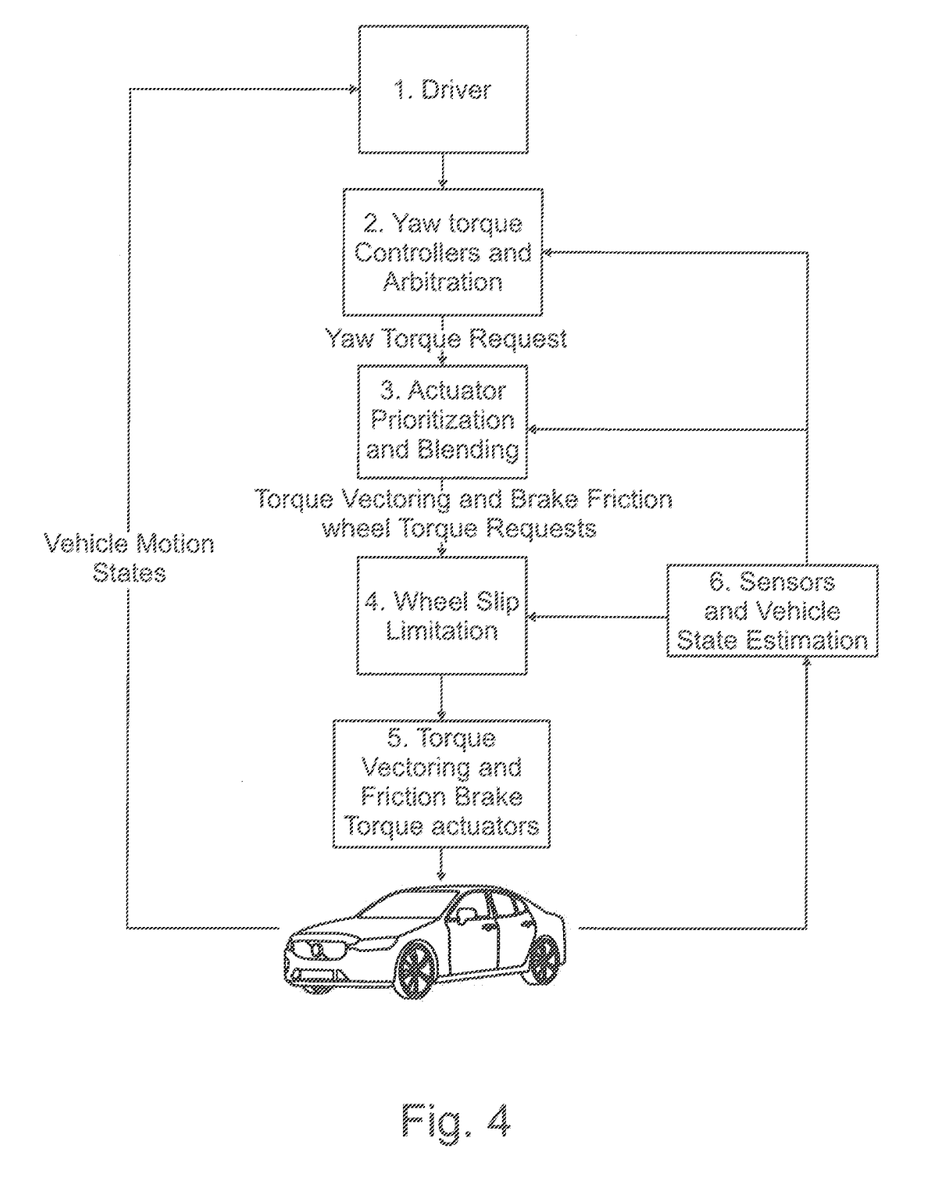
FIG. 4 shows, in a block diagram, an overview of an exemplary yaw torque blending workflow.

FIG. 4 shows an overview of an exemplary yaw torque blending workflow in a block diagram.

In block 2, the central control function module may receive inputs from the driver, and vehicle state estimates and feedback of the vehicle motion from block 6. As described above, the plurality of yaw torque controllers of the central control function module can determine a plurality of yaw torques, such as forward yaw torque, feedback under-steer yaw torque, and feedback over-steer yaw torque, based on the received data for controlling the yaw behavior of the vehicle. These exemplary yaw torques are described below.

Feed-Forward Yaw Torque:

As the global automotive market moves towards electrification, vehicle weights have been showing an increasing trend due to the increase in battery weights. This increases their yaw inertia and thus makes the driving feel less responsive and agile. Thus, to make the vehicle feel more responsive and mask the effects of high yaw inertia of the vehicle, a feed-forward yaw torque may be calculated based on the driver intentions. This yaw torque may help the driver to negotiate a turn and the contribution increases if the driving is more active. Driver intentions may be calculated based on the driver's throttle and steering inputs and the vehicle motion inputs from block 6 in FIG. 4.

Feedback Under-Steer Yaw Torque:

When driving close to the friction limit, usually it is the front axle that initially gets saturated and limits the lateral forces, especially when there is a propulsive torque on the front axle that further reduces the lateral force capacity. This limits the amount of yaw torque generated by the front lateral tire forces, and thus makes the vehicle under-steer. In these situations, a corrective yaw torque in the direction of the turn could help the driver mitigate the under-steering behavior. To detect such a situation, and to quantify the amount of under-steer, sensor signals like wheel speeds, yaw rate and lateral acceleration could be used to calculate a model-based steering angle needed to negotiate the turn, as shown in block 6 of FIG. 4. This could then be compared to the actual steering angle and used as a control variable to calculate an appropriate amount of corrective yaw torque.

Feedback Over-Steer Yaw Torque:

An over-steering situation might occur when the vehicle is driven close to the friction limit, either in a dynamic or a steady-state manner. A collision avoidance manoeuvre is an example of such a dynamic manoeuvre. In such situations, to reduce the over-steering behavior, the yaw velocity should be dampened by applying a corrective yaw torque using a controller on the yaw rate and using suitable limits to avoid interventions when it is not needed. If the dampening yaw torque is not enough, the vehicle could continue over-steering, which increases the phase lag between the driver inputs and the vehicle response. To reduce the phase lag, a corrective yaw torque needs to be applied which is based on the difference between the yaw rate of the vehicle and the driver intended yaw rate. The driver intended yaw rate may be calculated using sensor inputs like steering wheel angle, wheel speed sensors, lateral acceleration, etc.

Over-steering can also occur when driving in a steady-state manner close to the friction limit. An example of such a scenario is when a driver releases the throttle, and applies the brake, and/or increases the steering input, when driving at the limit. This causes a load transfer from the rear axle to the front axle, which reduces the lateral force capacity of the rear axle and pushes the vehicle into an over-steering situation. The yaw rate deviation in these cases has a very small value which cannot be used as a control variable in without having unintended interventions in other situations due to excessively sensitive control thresholds. Thus, to mitigate slow over-steering in steady-state limit driving situations, the side-slip on the rear axle could be used as a control variable, with appropriate thresholds, to calculate a corrective yaw torque. Sideslip on the rear axle can be calculated using the vehicle motion feedback (within block 6 in FIG. 4), and it is a good measure of over-steering in these situations as it quantifies the lateral velocity of the rear axle, and an excessive lateral velocity indicates an over-rotation of the vehicle.

The corrective yaw torques calculated by all the individual controllers need to be arbitrated depending on the driving situation and a single yaw torque value needs to be calculated on the vehicle level. Different arbitration strategies could be used which gives the intended attributes in terms of agility and stability. This arbitrated yaw torque is then sent from block 2 to 3, where appropriate actuators are chosen by the central control function module to apply the corrective yaw torque considering various types of limitations and feedback of the executed yaw torque from the actuators. This will be explained further in the sections below.

Actuator Capacity Limitation

In some examples, the central control function module may be configured to receive data indicative of a yaw torque capability of each actuator, to determine, based on the yaw torque capability, at least one actuator for executing the requested yaw torque, to redistribute the yaw torque request between the at least one first actuator and the at least one second actuator when needed, and to deliver the yaw torque request to at least one determined actuator.

In other words, a method is proposed to realize this vehicle level corrective yaw torque by using different actuators like the powertrain torque vectoring system, the wheel-individual brake system etc. To be able to do this, a calculation of the yaw torque capacity for the individual actuators may be needed, which would give an indication of the capability of each actuator to deliver a requested yaw torque. For example, in a vehicle configuration where at least two wheels are driven by wheel-individual electric motors and has a friction brake actuator for each wheel, a wheel torque capacity could be calculated for the electric motor and for the friction brake actuator for each wheel, which could then be used to recalculate a vehicle level yaw torque capacity. Electric motors typically have a speed dependent torque characteristic which is calculated from the maximum power, and the torque capacity of the friction brakes can be calculated based on the brake pad friction coefficient, brake dimensions, and the clamping force capacity of the actuator. If a TVDC actuator is used with a single electric motor or combustion engine on an axle, the maximum torque transfer capacity of the wheel-individual clutches can be used to calculate the yaw torque capacity. Similar torque capacity calculation can also be done for an eLSD or any other type of torque vectoring actuator or other types of wheel individual brake actuators. This calculation can be carried out using sensor signals from block 6 and the calculated yaw torque capacity could be used in block 3 as a limitation for requesting yaw torque from each actuator.

Tire Capacity Limitation

In some examples, the central control function module may be configured to receive data indicative of a tire longitudinal force generation capability of each tire of the vehicle, to determine, based on the tire longitudinal force generation capability, at least one actuator for executing the requested yaw torque, to redistribute the yaw torque request between the at least one first actuator and the at least one second actuator when needed, and to deliver the yaw torque request to at least one determined actuator.

In other words, another limiting factor that needs to be considered may be the longitudinal force generation capacity of the tires. Any amount of wheel torque requested from any actuator can only generate a limited amount of longitudinal force depending on the longitudinal force capacity of the tires. Tires can generate longitudinal and lateral forces, but they are limited by the amount of vertical load on the tire and the friction coefficient of the surface. This limitation can be captured by various tire models, but just for simplification, a circle can be used to visualize this.

Figure 5:
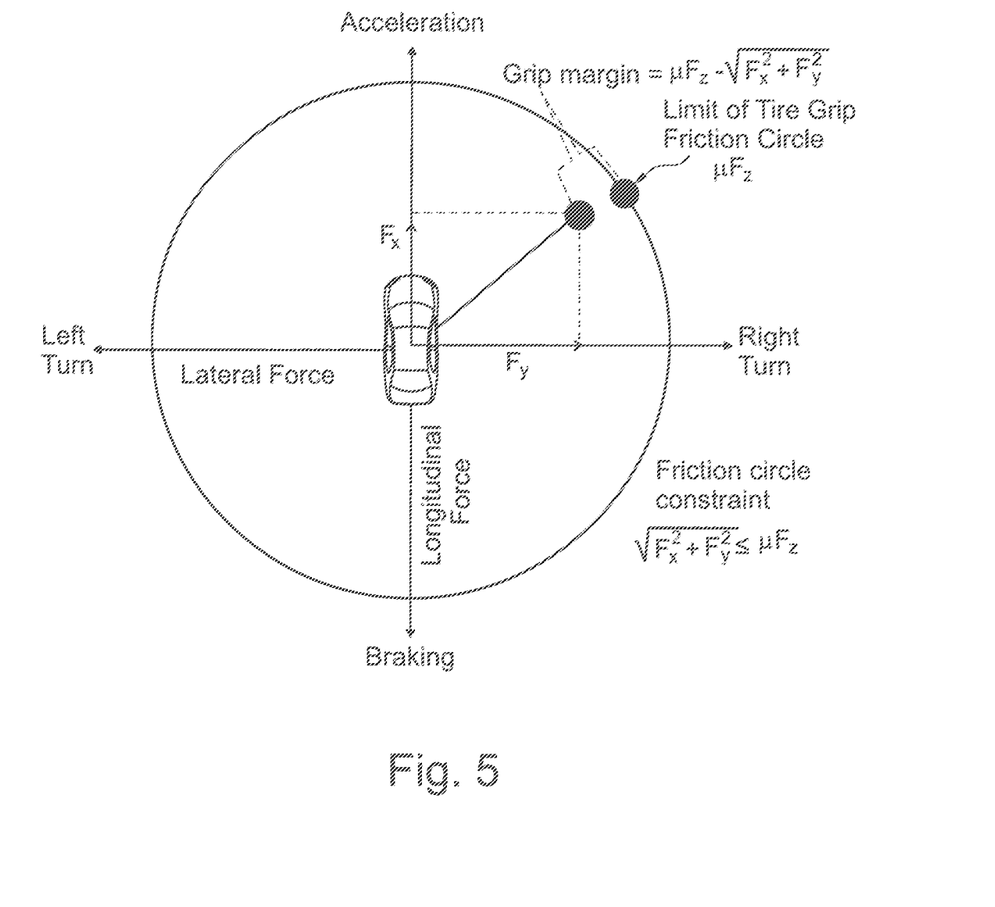
FIG. 5 shows the friction circle and force limitation of a tire.

FIG. 5 shows the friction circle and force limitation of a tire. Here, $F_x$ represents the longitudinal force generated by the tire, $F_y$ is the lateral force, $F_z$ is the vertical force and $\mu$ is the friction coefficient of the surface. To calculate the longitudinal force capacity of the tires, an estimate of the vertical load on the tires is needed and can be calculated using the accelerometer signals and using various vehicle models, within block 6 in FIG. 4. Some examples of modeling techniques are, but not limited to, a rigid body assumption of the vehicle, or a sprung and un-sprung mass assumption which are coupled together with a rotational spring and damper, or a two-track model, among others. The friction coefficient of the surface can also be estimated using different methods, for example, but are not limited to, utilization-based friction calculation using the lateral and longitudinal accelerometer signals, or a vision-based friction estimation using cameras, among others. The lateral force generated from a tire can also be estimated using sensor signals like lateral acceleration, steering wheel angle, wheel speeds and yaw rate, together with different vehicle models like, but not limited to, single-track vehicle model, two-track vehicle model, among others. The longitudinal force capacity for each tire can then be calculated using the vertical force, the coefficient of friction and the lateral force, using different tire models.

The longitudinal force capacity calculated for each tire may be used to calculate a vehicle level yaw torque capacity using the track-width and the wheel radius. This yaw torque capacity can be used in block 3 as a limitation for requesting a yaw torque using a particular tire to avoid over-utilizing any tire when another tire could be used which has a higher capacity to generate longitudinal forces.

Feedback of the Executed Yaw Torque

In some examples, the central control function module may be configured to receive a feedback of an amount of yaw torque that has already been executed, to determine, based on the feedback, one or more additional actuators for executing the requested yaw torque, if an insufficient or excessive execution of the request yaw torque is determined.

Another important aspect that needs to be considered is the amount of yaw torque that has already been executed by the different actuators. This may be needed because it might be possible that one or more actuators are unable to deliver the requested wheel torque due to physical limitations and actuator delays, limitations from other functionalities, or some failure mode, which causes insufficient execution of the requested yaw torque. It might also be possible that some actuators deliver more than it is requested from them, leading to an over-execution of the requested yaw torque. In these situations, if other actuators do not compensate for the difference proactively, it might cause an unwanted change in the vehicle yaw behavior, as the calculated amount of corrective yaw torque would not be applied accurately. In this case, a feedback of the amount of executed wheel torques by each actuator (from block 6 to block 3 as shown in FIG. 4) is needed to calculate the amount of yaw torque executed by each actuator, so that the deficit or excess can be compensated by other actuators. An example could be, but is not limited to, a vehicle with ESC system and an electric motor with a TVDC system on one axle. In a situation where the amount of motor torque is limited due to an active traction control request, and the requested yaw torque cannot be fulfilled by the TVDC system, a feedback of the executed wheel torques by the TVDC system may be provided to calculate the amount of yaw torque that it is delivered by it. The remaining could then be sent to the ESC system to be executed by the wheel-individual friction brakes. In this manner, an accurate amount of corrective yaw torque can be applied by using several actuators that complement each other.

Actuator Prioritization and Blending

In some examples, as shown in block 3 in FIG. 4, the central control function module may be configured to receive data indicative of an intended vehicle attribute describing the desired characteristics of the vehicle, to determine a prioritization order for the at least one first actuator and the at least one second actuator depending on the driving situation and the intended vehicle attribute, and to deliver the yaw torque request to the at least one first actuator and the at least one second actuator according to the determined prioritization order. The intended vehicle attribute may be energy efficiency, driving experience, safety, noise, vibration, or any combination thereof.

In other words, depending on the driving situation, a prioritization order may be decided for all the actuators. For example, in a vehicle with a torque vectoring actuator and a wheel individual friction brake actuator with ESC, when driving significantly below the grip limit, the torque vectoring actuator could be prioritized over the ESC system as it is usually silent and can avoid the pump and valve noise that an ESC actuator creates. This can give a more premium driving experience while not compromising on agility and safety. Moreover, if wheel-individual electric motors are used, it can also be energy efficient as regenerative braking can be used to recuperate the energy which would otherwise be lost as heat if the friction brake system is used. Driving at high speeds, usually reduces the torque capacity of an electric motor or combustion engine due to power limitations. In these cases, the ESC system could be used instead of the torque vectoring system. With a TVDC actuator or an eLSD it might be possible to overheat the clutches, which can lead to a reduced or no torque transfer capacity, and then the ESC system could be used to realize the requested corrective yaw torque. Apart from these examples, there might be other situations in which one actuator could be preferred over others depending on the target attributes for the vehicle.

After prioritizing the actuators based on the driving situation, to execute the corrective yaw torque request, yaw torque limitations from actuator capacities and from tire longitudinal force capacities may need to be considered. A redistribution of the yaw torque to other actuators (according to the actuator prioritization) should be done if one or more of these capacity limitations are exceeded. The feedback of the executed yaw torque from different actuators then needs to be considered to carry out a redistribution (according to the actuator prioritization) depending on how much each actuator has been able to deliver as compared to the requested yaw torque from it.

After the above yaw torque blending process is carried out, the final yaw torque request to each actuator needs to be converted to wheel torque requests using the respective track-width and the tire rolling radius and sent out from block 3 to the wheel slip limitation block 4.

Wheel Slip Limitation

In the wheel slip limitation block 4, the central control function module may be configured to receive a feedback of individual wheel longitudinal slips, and to control, based on the feedback of individual wheel longitudinal slips, a maximum yaw torque that is requested from the at least one first actuator and/or at least one second actuator.

Figure 6:
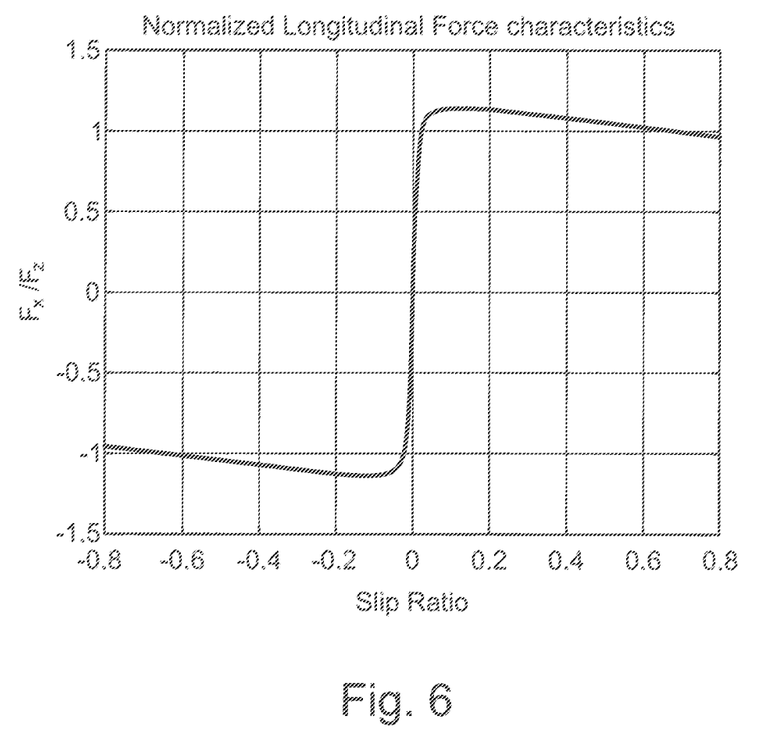
FIG. 6 shows normalized longitudinal tire force characteristics.

The longitudinal force generated by the tires is dependent on the vertical load on them, and the longitudinal slip. A typical tire force curve for a particular vertical load can be visualized in FIG. 6, which shows normalized longitudinal tire force characteristics. Longitudinal slip is quantified by slip ratio, which is the ratio of the difference of velocity between the center of the wheel and its tangential velocity at the tire-road contact patch, to the velocity at the center of the wheel. As it can be seen in FIG. 6, the longitudinal forces peak at a certain slip ratio, and then gradually decrease with increasing slip. Thus, having a large slip ratio decreases the longitudinal force generated by the tires, which also decreases the yaw torque generated from the longitudinal tire forces. Another effect of having a large longitudinal slip on the tires is the reduction of the lateral force capacity of the tires, which may also lead to a significant change in the under and over-steering behavior of the vehicle. High longitudinal slip can occur if a significant amount of torque is requested from an actuator which exceeds the grip limit of the tire, or if there is a sudden change in the friction coefficient. Thus, to ensure that an accurate amount of corrective yaw torque can be realized, it is essential to limit the amount of longitudinal wheel slip, so that an unintended reduction in longitudinal and lateral forces does not occur. This wheel slip limitation can be ensured by controlling the maximum torque that is requested from the actuators based on a feedback control of the individual wheel longitudinal slips. For the wheel-individual brake actuator, functionalities like ABS (anti-lock braking system), EBD (electronic brake-force distribution) etc. can be used to reduce the friction brake torque. In torque vectoring systems like wheel-individual electric motors, the traction control system and the regenerative braking control system can be used to limit the maximum motor torques based on longitudinal wheel slips. This process is done in block 4 as shown in FIG. 4. The slip limited wheel torque request from block 4 is then sent to each actuator as shown in block 5.

Figure 7:
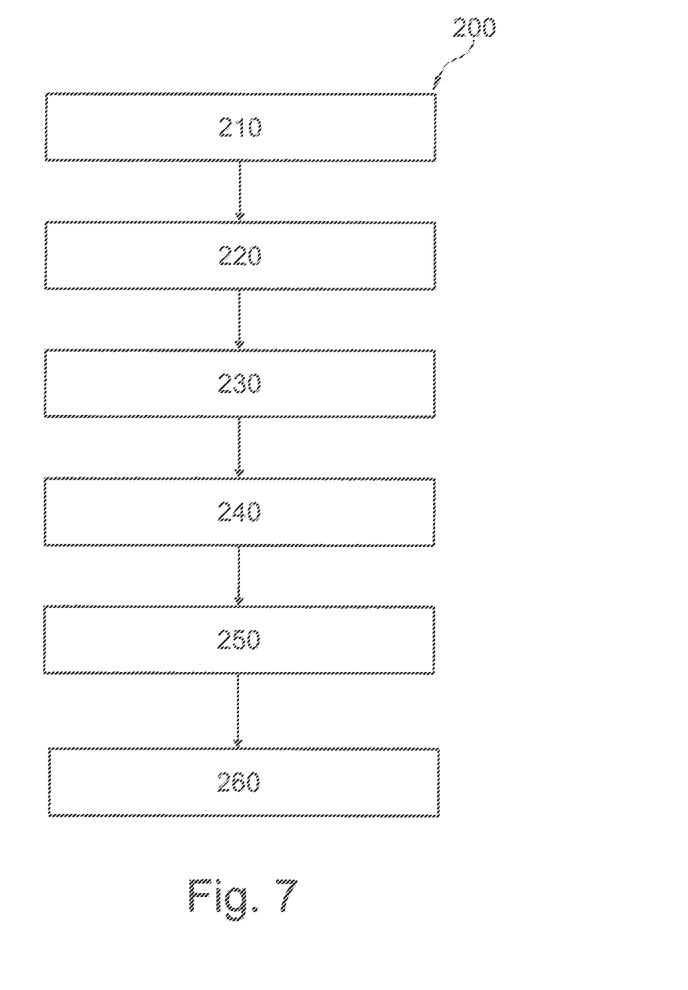
FIG. 7 shows a flow chart of an exemplary yaw motion control method.

FIG. 7 shows a flow chart of an exemplary yaw motion control method 200 for coordinating and synchronizing a wheel-individual brake system and a power-train torque vectoring actuator system in a vehicle. The wheel-individual brake system includes at least one first actuator for applying a braking torque to individual wheels of the vehicle. The power-train torque vectoring actuator system includes at least one second actuator for applying a torque to individual wheels of the vehicle through a propulsion system.

The at least one first actuator may include a service brake system, which refers to the primary system for braking, for example, but not limited to, an electro-hydraulic brake system, an electro-mechanical brake system, or any combination thereof. Examples of the at least one second actuator may include, but are not limited to, a wheel-individual electric motor, a torque vectoring dual clutch, a torque vectoring differential, an electronic limited slip differential, or any combination thereof.

In a step 210, the method includes receiving, by each yaw torque controller in a central control function module, data including driver inputs and vehicle motion states. Examples of the driver inputs may include, but are not limited to, the driver's throttle and steering inputs. Vehicle motion states and driver inputs may be derived from sensor inputs including, but not limited to steering wheel angle, wheel speed sensors, lateral acceleration, etc.

In a step 220, the method includes determining, by each yaw torque controller in the central control function module, a respective yaw torque based on the received data for controlling the yaw behavior of the vehicle.

Examples of the yaw torque controllers may include, but are not limited to, a feedforward controller and feedback controllers.

Examples of the yaw torques may include, but are not limited to, a feedforward yaw torque, a feedback under-steer yaw torque, a feedback over-steer yaw torque, or any combination thereof.

In a step 230, the method includes determining, by the central control function module, a driving situation based on the received data.

In a step 240, the method includes arbitrating, by the central control function module, the plurality of yaw torques from individual yaw torque controllers to determine a single yaw torque based on the driving situation. Different arbitration strategies could be used which gives the intended attributes in terms of agility and stability.

In a step 250, the method includes determining a prioritization order for the at least one first actuator and at least one second actuator depending on the driving situation and an intended vehicle attribute describing desired characteristics of the vehicle.

In a step 260, the method further includes coordinating the execution of the yaw torque by the wheel-individual brake system and the power-train torque vectoring actuator system to deliver the yaw torque request to the at least one first actuator and at least one second actuator according to the determined prioritization in order to execute the single yaw torque.

The method includes delivering a yaw torque request to at least one first actuator and/or at least one second actuator to execute the single yaw torque.

The method may further include the following optional steps, which are explained in detail with respect to the example shown in FIG. 4.

The method may further include the steps of receiving data indicative of a yaw torque capability of each actuator, determining, based on the yaw torque capability, at least one actuator for executing the requested yaw torque, to redistribute the yaw torque request between the at least one first actuator and the at least one second actuator when needed, and delivering the yaw torque request to at least one determined actuator.

The method may further include the steps of receiving data indicative of a tire longitudinal force generation capability of each tire of the vehicle, determining, based on the tire longitudinal force generation capability, at least one actuator for executing the requested yaw torque, to redistribute the yaw torque request between the at least one first actuator and the at least one second actuator when needed, and delivering the yaw torque request to at least one determined actuator.

The method may further include the steps of receiving a feedback of an amount of yaw torque that has already been executed, determining, based on the feedback, one or more additional actuators for executing the requested yaw torque, if an insufficient or excessive execution of the request yaw torque is determined.

The method may further include the steps of receiving a feedback of individual wheel longitudinal slips, and controlling, based on the feedback of individual wheel longitudinal slips, a maximum yaw torque that is requested from the at least one first actuator and/or at least one second actuator.

In an example of the present disclosure, a computer program or a computer program element is provided that is characterized by being adapted to execute the method steps of the method according to one of the preceding embodiments, on an appropriate system.

The computer program element might therefore be stored on a computer unit, which might also be part of an embodiment of the present disclosure. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the disclosure.

This aspect disclosure covers both a computer program that right from the beginning uses the disclosure and a computer program that by means of an up-date turns an existing program into a program that uses the disclosure.

Further on, the computer program element might be able to provide all necessary steps to fulfil the procedure of an exemplary embodiment of the method as described above.

According to an example of the present disclosure, a computer readable medium, such as a CD-ROM, is presented wherein the computer readable medium has a computer program element stored on it, which computer program element is described by the preceding section.

A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to an example of the present disclosure, a medium for making a computer program element available for downloading is provided, which computer program element is arranged to perform a method according to one of the previously described embodiments of the disclosure.

Other variations to the disclosed embodiments can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

The invention claimed is:

1. A vehicle motion control system for coordinating and synchronizing a wheel-individual brake system and a power-train torque vectoring actuator system in a vehicle, the wheel-individual brake system comprising at least one first actuator for applying a braking torque to individual wheels of the vehicle, and the power-train torque vectoring actuator system comprising at least one second actuator for applying a torque to individual wheels of the vehicle through a propulsion system, the vehicle motion control system comprising:
   a central control function module comprising a plurality of yaw torque controllers;

each yaw torque controller being configured to receive data including a driver input and a vehicle motion state to determine, based on the received data, a respective yaw torque for controlling a yaw behavior of the vehicle; and the central control function module being configured to determine a driving situation based on the received data, arbitrate the plurality of yaw torques from individual yaw torque controllers to determine a single yaw torque based on the driving situation, to determine a prioritization order for the at least one first actuator and the at least one second actuator depending on the driving situation and an intended vehicle attribute describing desired characteristics of the vehicle, and to coordinate an execution of the single yaw torque by the wheel-individual brake system and the power-train torque vectoring actuator system to deliver a yaw torque request to the at least one first actuator and the at least one second actuator according to the determined prioritization in order to execute the single yaw torque.

2. The vehicle motion control system according to claim 1, the intended vehicle attribute comprising at least one of energy efficiency, driving experience, safety, noise, and vibration.

3. The vehicle motion control system according to claim 1, the central control function module being configured to receive data indicative of a yaw torque capability of each actuator, to determine, based on the yaw torque capability, at least one actuator for executing the requested yaw torque, to redistribute the yaw torque request between the at least one first actuator and the at least one second actuator when needed, and to deliver the yaw torque request to the at least one determined actuator.

4. The vehicle motion control system according to claim 1, the central control function module being configured to receive data indicative of a tire longitudinal force generation capability of each tire of the vehicle, to determine, based on the tire longitudinal force generation capability, at least one actuator for executing the requested yaw torque, to redistribute the yaw torque request between the at least one first actuator and the at least one second actuator when needed, and to deliver the yaw torque request to the at least one determined actuator.

5. The vehicle motion control system according to claim 1, the central control function module being configured to receive a feedback of an amount of yaw torque that has already been executed, to determine, based on the feedback, one or more additional actuators for executing the requested yaw torque, if an insufficient or excessive execution of the requested yaw torque is determined.

6. The vehicle motion control system according to claim 1, the central control function module being configured to receive a feedback of individual wheel longitudinal slips, and to control, based on the feedback of individual wheel longitudinal slips, a maximum yaw torque that is requested from the at least one first actuator and/or the at least one second actuator.

7. The vehicle motion control system according to claim 1, the plurality of yaw torque controllers comprising a feedforward controller, a feedback controller, or any combination thereof.

8. The vehicle motion control system according to claim 1, the plurality of yaw torques comprising a feedforward yaw torque, a feedback under-steer yaw torque, a feedback over-steer yaw torque, or any combination thereof.

9. A vehicle, comprising:
a wheel-individual brake system comprising at least one first actuator for applying a braking torque to individual wheels of the vehicle;
a power-train torque vectoring actuator system comprising at least one second actuator for applying a torque to individual wheels of the vehicle through a propulsion system; and
a vehicle motion control system configured to coordinate and synchronize the wheel-individual brake system and the power-train torque vectoring actuator system, the vehicle motion control system comprising:
a central control function module comprising a plurality of yaw torque controllers;
each yaw torque controller being configured to receive data including a driver input and a vehicle motion state to determine, based on the received data, a respective yaw torque for controlling a yaw behavior of the vehicle; and
the central control function module being configured to determine a driving situation based on the received data, arbitrate the plurality of yaw torques from individual yaw torque controllers to determine a single yaw torque based on the driving situation, to determine a prioritization order for the at least one first actuator and the at least one second actuator depending on the driving situation and an intended vehicle attribute describing desired characteristics of the vehicle, and to coordinate an execution of the single yaw torque by the wheel-individual brake system and the power-train torque vectoring actuator system to deliver a yaw torque request to the at least one first actuator and the at least one second actuator according to the determined prioritization in order to execute the single yaw torque.

10. The vehicle according to claim 9,
the at least one first actuator comprising a service brake system configured to apply a brake torque to individual wheels.

11. The vehicle according to claim 9,
the at least one second actuator comprising a wheel-individual electric motor, a torque vectoring dual clutch, a torque vectoring differential, an electronic limited slip differential, or any combination thereof.

12. The vehicle according to claim 9, further comprising:
a sensor system comprising one or more sensors for detecting the vehicle motion state of the vehicle and the driver input.

13. A vehicle motion control method for coordinating and synchronizing a wheel-individual brake system and a power-train torque vectoring actuator system in a vehicle, the wheel-individual brake system comprising at least one first actuator for applying a braking torque to individual wheels of the vehicle, and the power-train torque vectoring actuator system comprising at least one second actuator for applying a torque to individual wheels of the vehicle through a propulsion system, the vehicle motion control method comprising the steps of:
- receiving, by each yaw torque controller of a plurality of yaw torque controllers in a central control function module, data including a driver input and a vehicle motion state;
- determining, by each yaw torque controller in the central control function module, a respective yaw torque based on the received data for controlling a yaw behavior of the vehicle;
- determining, by the central control function module, a driving situation based on the received data;
- arbitrating, by the central control function module, the plurality of yaw torques from individual yaw torque controllers to determine a single yaw torque based on the driving situation;
- determining a prioritization order for the at least one first actuator and the at least one second actuator depending on the driving situation and an intended vehicle attribute describing desired characteristics of the vehicle; and
- coordinating an execution of the single yaw torque by the wheel-individual brake system and the power-train torque vectoring actuator system to deliver a yaw torque request to the at least one first actuator and the at least one second actuator according to the determined prioritization in order to execute the single yaw torque.

14. A non-transitory computer-readable medium comprising instructions stored in a memory and executed by a processor to carry out the steps of the method according to claim 13.

* * * * *